US011818104B2

(12) United States Patent
Avitbul

(10) Patent No.: US 11,818,104 B2
(45) Date of Patent: Nov. 14, 2023

(54) ANONYMOUS PROXYING

(71) Applicant: NetNut Ltd., Tel Aviv (IL)

(72) Inventor: Barak Avitbul, Tel Aviv (IL)

(73) Assignee: NetNut, Ltd., Tel Aviv (IL)

( * ) Notice: Subject to any disclaimer, the term of this patent is extended or adjusted under 35 U.S.C. 154(b) by 0 days.

(21) Appl. No.: 18/176,666

(22) Filed: Mar. 1, 2023

(65) Prior Publication Data

US 2023/0283596 A1    Sep. 7, 2023

Related U.S. Application Data

(60) Provisional application No. 63/315,382, filed on Mar. 1, 2022.

(51) Int. Cl.
*H04L 9/40* (2022.01)
*H04L 69/164* (2022.01)
*H04L 61/5007* (2022.01)
*H04L 101/668* (2022.01)

(52) U.S. Cl.
CPC ...... *H04L 63/0421* (2013.01); *H04L 61/5007* (2022.05); *H04L 63/0428* (2013.01); *H04L 69/164* (2013.01); *H04L 2101/668* (2022.05)

(58) Field of Classification Search
CPC ............. H04L 63/0421; H04L 63/0428; H04L 61/5007; H04L 69/164; H04L 2101/668
USPC .......................................................... 726/3
See application file for complete search history.

(56) References Cited

U.S. PATENT DOCUMENTS

| 9,325,611 | B2* | 4/2016 | Caputo, II | H04L 45/44 |
| 10,659,569 | B1* | 5/2020 | Tourrilhes | H04L 45/24 |
| 10,873,564 | B2* | 12/2020 | Mosko | H04L 61/2517 |
| 10,992,635 | B2* | 4/2021 | Kapoor | H04L 67/10 |
| 10,999,244 | B2* | 5/2021 | Mittal | G06F 9/45558 |
| 11,374,899 | B2* | 6/2022 | Hira | H04L 47/125 |

(Continued)

FOREIGN PATENT DOCUMENTS

EP    3 166 276 A1    5/2017

OTHER PUBLICATIONS

PCT International Search Report and Written Opinion, issued in PCT/IB2023/000115, dated Aug. 2, 2023 (12 pages).

*Primary Examiner* — Amare F Tabor
(74) *Attorney, Agent, or Firm* — Finnegan, Henderson, Farabow, Garrett & Dunner, LLP

(57) ABSTRACT

A management device can establish an anonymous communication session between a first device and a second device. The anonymous communication session can include a first outgoing communication session with the second device and a second incoming communication session with a third device. The first device can be a client in the first outgoing communication session. The second device can be a server in the second incoming communication session. The third device can route communications received from the second device to the first device. The management device can intercept first communications from the first device, modify the intercepted first communications to accord with the second incoming communication session, and provide the modified first communications to the second device. The management device can obtain second communications routed from the third device, modify the obtained second communications to accord with the first outgoing communication session, and provide the modified second communications to the first device.

20 Claims, 9 Drawing Sheets

(56) References Cited

U.S. PATENT DOCUMENTS 11,616,755 B2 * 3/2023 Boutros ................ H04L 45/745
  370/392
2012/0057595 A1 3/2012 Awano

* cited by examiner

ANONYMOUS PROXYING

CROSS REFERENCE TO RELATED APPLICATION

This application claims the benefit of priority of U.S. Provisional Application No. 63/315,382, filed Mar. 1, 2022. The foregoing application is incorporated herein by reference in its entirety.

TECHNICAL FIELD

The present disclosure relates generally to anonymizing requests for content from a web server or other provider providing content.

BACKGROUND

An anonymous proxy can enable a user device to access a target device (e.g., when browsing the internet) without disclosing the Internet Protocol (IP) address (or potentially location) of the user device to the target device. An anonymous proxy can serve as an intermediary between the user device and the target device, receiving a request from the user device, providing the request to the target device as if it originated at the anonymous proxy, receiving results from the target device, and providing these results to user device. In general, using anonymous proxies may increase user security and prevent identity theft, avoid targeted marketing, and bypass geo-blocking.

However, conventional anonymous proxies may require substantial bandwidth and computing power. These requirements can make conventional anonymous proxies slow and inefficient. Furthermore, the entity running a conventional anonymous proxy may be able to access the requests received from the user device and may know the original IP address of the user device. A malicious attacker can therefore use an anonymous proxy to collect the web traffic data of potentially identifiable users—users who presumably chose to use an anonymous proxy because they feared such an attack.

SUMMARY

A management device can enable a user device to provide anonymous requests to a target device using a client device. The management device can establish an anonymous communication session that includes an outgoing communication session and an incoming communication session. The management device can intercept or obtain messages passing between the user device (or a proxy thereof) and the target device. The management device can then modify these messages such that they are correctly routed to support the anonymous communication session.

The disclosed embodiments include a method for anonymous communication between a first device and a second device. The method can include an operation of establishing, by a management device, an anonymous communication session between the first device and the second device. The anonymous communication session can include a first outgoing communication session with the second device, the first device being a client in the first outgoing communication session. The anonymous communication session can include a second incoming communication session with a third device selected by the management device, the second device being a server in the second incoming communication session and the third device being configured to automatically route communications received in the second incoming communication session to the first device. The method can include an operation of intercepting, by the management device, first communications from the first device, modifying the intercepted first communications to accord with the second incoming communication session, and providing the modified first communications to the second device. The method can include an operation of obtaining, by the management device, second communications routed from the third device, modifying the obtained second communications to accord with the first outgoing communication session, and providing the modified second communications to the first device.

The disclosed embodiments include an additional method for anonymizing a request for a target device. The method can include receiving a request, replacing a source address of the request with an address of a peer, sending the request with the replaced source address to the target device, and receiving a response to the request for content from the target device via the peer.

The disclosed embodiments include an additional method. The method can include receiving a message from a peer, the message including an IP address of the peer, adding the IP address of the peer to a set of IP address, receiving a message from a client device, and sending, in response to receiving the message from the client device, at least a portion of the set of IP addresses.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
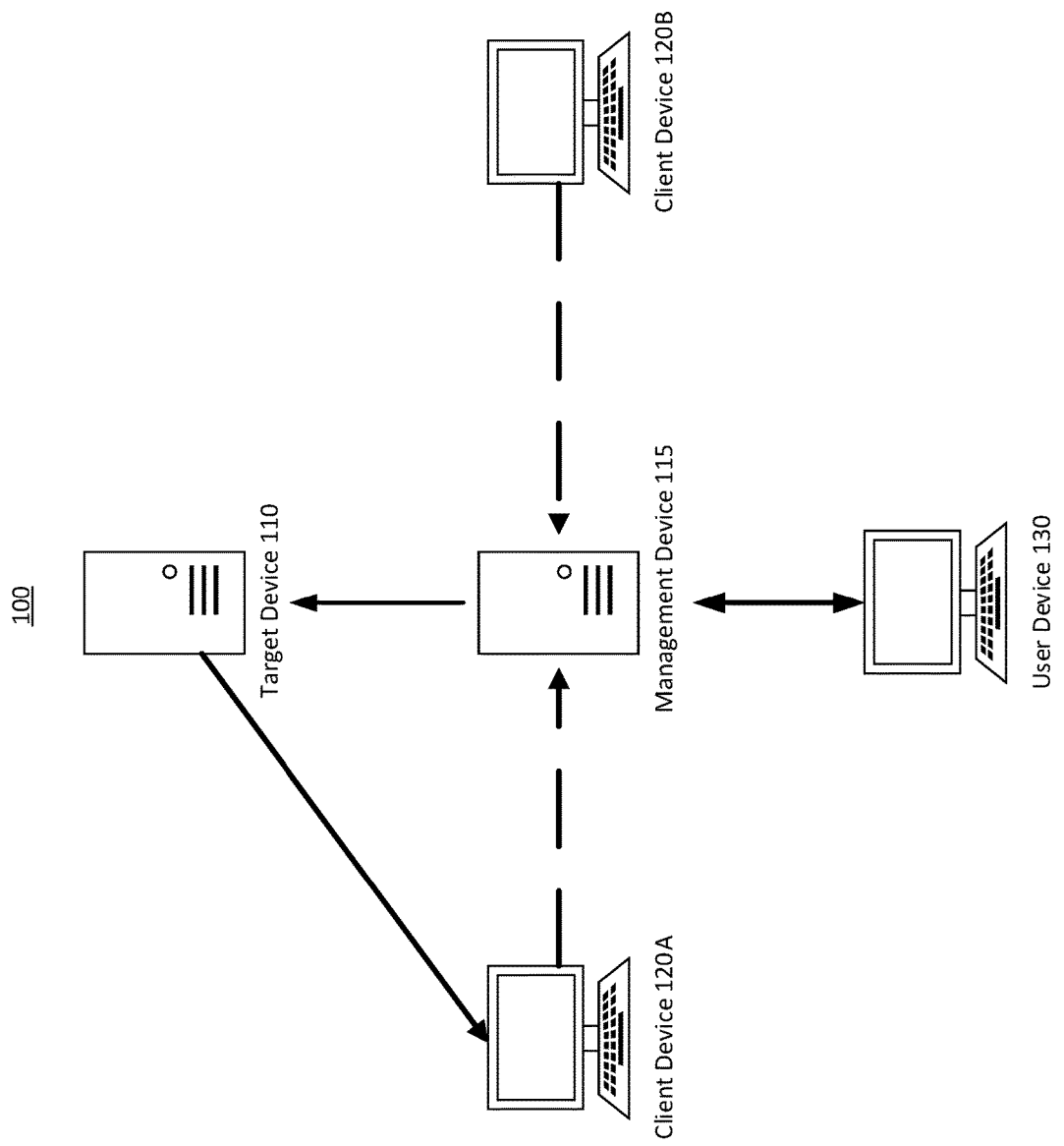
FIG. 1 depicts an exemplary system for anonymizing a request from a target device, in accordance with disclosed embodiments.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Well-known methods, procedures, and components have not been described in detail so as not to obscure the principles of the example embodiments. Additionally, some of the described embodiments or elements thereof can occur or be performed simultaneously, at the same point in time, or concurrently. Accordingly, the following detailed description is not limited to the disclosed embodiments and examples. Instead, the proper scope is defined by the appended claims.

Conventional anonymous proxies address anonymity and security requirements arising in the field of network communications. However, these conventional anonymous proxies may require substantial bandwidth and computing power, making them slow and inefficient. Furthermore, the entity running a conventional proxy server may have access to the unencrypted internet activity and the original IP address of the user device. A malicious attacker can therefore use an anonymous proxy to collect the web traffic data of potentially identifiable users, compromising their security and anonymity. Conventional anonymous proxy servers therefore exhibit technological problems relating to security, efficiency, and functionality.

The disclosed embodiments provide technical solutions to technical problems associated with conventional anonymous proxy servers. Consistent with disclosed embodiments, a management device can provide requests to a target device without an intervening proxy server. The target device can then provide a response to the request to a client device. The client device can then provide the response data to the management device. The user device need not establish a TCP connection with the client device. In this manner, the technical problems of conventional anonymous proxies are addressed.

A request by a user device to a target device can include a request to perform an action on the target device. The action can involve content (e.g., image data, video data, a document, an object, a program, a webpage, or the like) or an application (e.g., an application exposed through a API, a web service, a microservice, or the like). The action can include retrieving the resource. The action can include providing data or instructions to the application and receiving the output of the application.

An anonymous request may not identify the user device making the request to the target device. In some embodiments, an anonymous request may not disclose the IP address (or potentially the location) of the user device.

FIG. 1 illustrates an exemplary system 100 for anonymizing a request from a target device 110, consistent with the disclosed embodiments. Components of system 100 can include target device 110, management device 115, client device 120A and 120B, and user device 130. These components can communicate over one or more networks. The disclosed embodiments are not limited to a particular arrangement or type of the network(s). In some embodiments, the network(s) can include the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or other suitable type of network. As may be appreciated, communications between components of system 100 can involve the use of multiple networks (and multiple associated communication protocols, if necessary). While system 100 is shown as a network-based environment, it is understood that the disclosed systems and methods may also be used in a localized system, with one or more of the components communicating directly with each other.

The disclosed embodiments are not limited to a particular implementation of the components depicted in FIG. 1. Each of these components can be or include one or more computing devices. For example, a component of system 100 can be an IoT device (e.g., sensor, smart home appliance, industrial device, connected vehicle, etc.), a wearable device (e.g., a smartwatch, smart jewelry, an implantable device, a fitness tracker, smart clothing, a head-mounted display, or the like), a mobile device (e.g., a smart phone, tablet, laptop, or the like), a desktop, server, mainframe, computing cluster, virtual machine (e.g., virtualized computer, container instance, etc.), or cloud computing platform configured to provide the disclosed functionality. For convenience of description, the disclosed embodiments are described herein as concerning a mobile user device, mobile or desktop client devices, a target device, and a managing device.

Target device 110 can be configured to receive requests and provide responses to the request, consistent with disclosed embodiments. As described herein, the request can involve content or an application. The disclosed embodiments are not limited to embodiments in which target device 110 stores the content or hosts the application. Instead, in some embodiments, target device 110 can communicate with a database or a server to satisfy the request. Target device 110 can be configured to receive requests for data (or for the performance of the service). In some embodiments, the requests can be HTTP (or HTTPS) requests, or the like. Target device 110 can be configured to provide an appropriate response (e.g., including retrieved data or a result of the performance of services). In some embodiments, the response can be a HTTP (or HTTPS) response message.

Management device 115 can be configured to interact with other components of system 100 to enable user device 130 to anonymously request content from a target device 110, consistent with disclosed embodiments. In some embodiments, management device 115 can be configured to maintain a set of connected client endpoints. A client endpoint can represent a client device that is available for use in anonymizing a content request (e.g., from user device 130). In some embodiments, management device 115 can provide an external HTTP proxy interface to user device 130. This interface can depict the set of connected client endpoints. The set of connected client endpoints can be grouped, ranked, or subset based on endpoint characteristics (e.g., endpoint device type, geographic location, available capacity, prior usage, user reviews, or the like). The user device 130 can interact with this interface to select a client device for use in providing anonymized requests. In some embodiments, the management device 115 can automatically select a client device for use in anonymizing requests (e.g., without providing such an interface to the user device 130). In some embodiments, the set of connected client endpoints can include the IP address of each connected client endpoint. When a client endpoint is used to anonymize a content request, the content request can appear to originate from the client endpoint. In some embodiments, the source IP address of user device 130 (or a proxy thereof) can be replaced with the IP address of the client endpoint when making the content request.

Client device 120A can be configured by reflector code for use in anonymizing content requests, consistent with disclosed embodiments. In some embodiments, client device 120A can be configured to forward packets received from target device 110 to management device 115 (or another device of system 100). Consistent with disclosed embodiments, client device 120A can be configured to establish a UDP tunnel with management device 115, package TCP packets received from target device 110 into UDP packets and transmit these UDP packets through the established UDP tunnel to management device 115. Consistent with disclosed embodiments, the client device 120A can be configured by the reflector code to operate as a transport-layer or internet-layer service. For example, the client device 120A can package and forward the received TCP packets without considering the application data contained within these packets.

Client device 120B can be configured similar to client device 120A. Client device 120A and client device 120B can be peer devices, in that these devices can be similarly privileged participants in the anonymization systems and methods described herein. For example, while FIG. 1 depicts a connection between target device 100 and client device 120A, client device 120B can be similarly capable of forming such a connection. In some embodiments, management device 115 can be configured to provide user device 130 with the option to choose among peer devices. The chosen peer device can then be used as the client device in performing the anonymization systems and methods described herein. In some embodiments, management device 115 can also be a peer device. In such embodiments, in addition to performing the management device role for client devices 120A and 120B, management device 115 can also perform the client device role for another device. In such embodiments, the device that performs the management device role can be the device contacted by user device 130. Similarly, in some embodiments, user device 130 can perform the management device role or the client device role for another device. In this manner, the components of system 100 can support complex and difficult to trace anonymization relationship, thereby increasing security. The ability of management device 115, user device 130, and client devices 120A and 120B to perform multiple roles also supports the reliability and scalability of the system.

User device 130 can be configured to provide content requests, consistent with disclosed embodiments. In some embodiments, a content request can be provided as a result of an interaction with a user. For example, a user can interact with a browser application running on user device 130 to navigate to a resource hosted on target device 110. In response to this interaction, user device 130 can request content from target device 110. In some embodiments, a content request can be provided in response to a condition or requirement being satisfied. For example, user device 130 can be an internet-of-things (IoT) device that is configured to request performance of a service when a condition is satisfied. When that condition is satisfied, user device 130 can provide a content request to target device 110 to request performance of the service.

Figure 2:
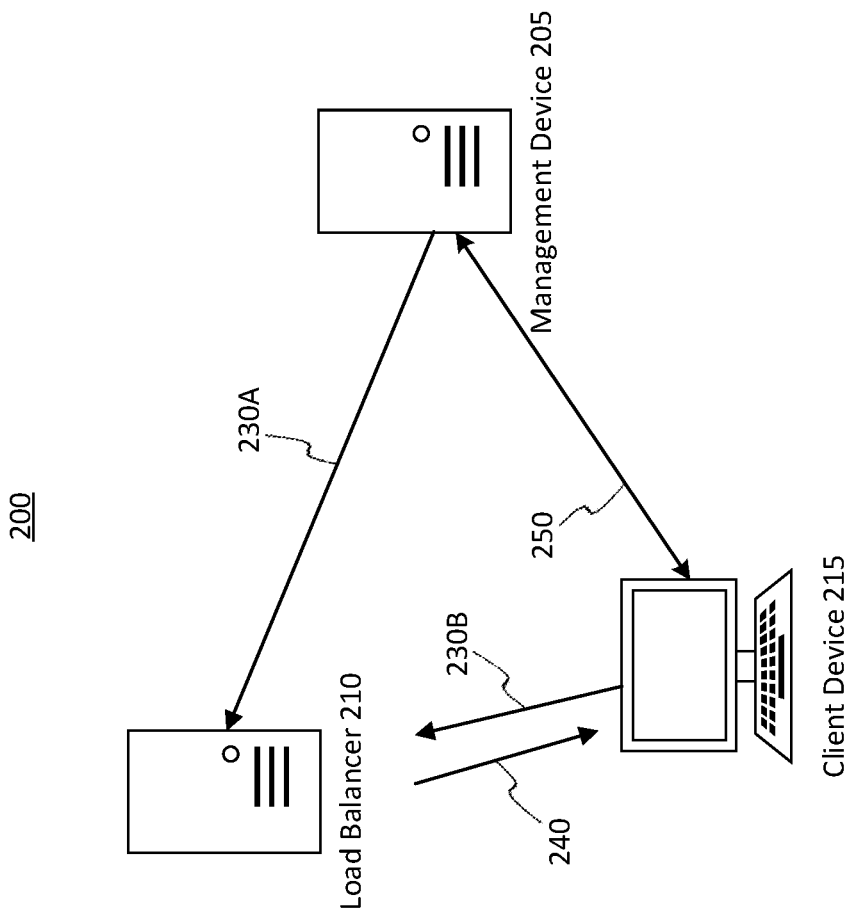
FIG. 2 depicts an exemplary service discovery process and associated system, in accordance with disclosed embodiments.

FIG. 2 depicts an exemplary service discovery process 200 and associated system, consistent with disclosed embodiments. The system and process depicted in FIG. 2 can be used with the system depicted in FIG. 1, or with another suitable system. Process 200 can be performed using a load balancer 210, a client device 215 (e.g., similar to client device 120A or 120B), and a management device 205 (e.g., similar to management device 115). As may be appreciated, a client device may require configuration to participate in system 100. For example, participation in system 100 can require that a client device be registered with a corresponding management device. Such registration can identify the client device to the management device and provide any information necessary for the management device to communicate with the client device (e.g., IP address, URL, credentials, or the like). Similarly, in some embodiments, the management device can require registration with the client device. In some embodiments, such registration can include configuring the management device and the client device to create a UDP tunnel between the client device and the management device.

Consistent with disclosed embodiments, load balancer 210 can be configured to associate client devices (e.g., client device 215) with management devices (e.g., management device 205). In some embodiments, load balancer 210 can provide a service (e.g., a directory service, web service, or the like) for associating client devices with management devices. For example, load balancer 210 can act as a point of contact for client devices or management devices. An IP address or URL of the load balancer 210 can be known to the client devices and the management devices. For example, the client devices and the management devices can be preconfigured with a suitable identifier of the load balancer 210 (e.g., an IP address, DNS entry, URL, or the other sufficient identifier for locating the load balancer). Load balancer 210 can provide the service using a connection formed with the client device (or the management device). In some embodiments, the connection can be a Hypertext Transfer Protocol Secure (HTTPS) connection, or the like. The service can provide connection information for a management device in response to a request from a client device.

Consistent with disclosed embodiments, load balancer 210 can be configured to distribute client devices across available management devices. Load balancer 210 can ensure that client devices connect with management devices capable of working with the client devices. In this manner, load balancer 210 can maintain the balance and scalability of system 100. In some embodiments, load balancer 210 can ensure an efficient distribution of client devices across management devices according to some distribution criterion. Load balancer 210 can distribute client devices across management devices through a variety of methods, including a round-robin method, a least connections method, a least time method, a hash method, or any other suitable method. In some embodiments, load balancer 210 can differentially associate client devices with management devices when multiple management devices are available. In such embodiments, system 200 can associate client devices with management devices based on characteristics of the management device (e.g., geographic location, workload, capacity, or utilization of the management device) or client device (e.g., geographic location).

At step 230A of process 200, management device 205 can register with load balancer 210, consistent with disclosed embodiments. In some embodiments, management device 205 can be registered with load balancer 210 using a suitable identifier for client device 215 (e.g., an IP address, DNS entry, URL, or the other sufficient identifier for locating the client device). At step 230B of process 200, client device 215 can register with load balancer 210. In some embodiments, client device 215 can be registered with load balancer 210 using a suitable identifier for client device 215 (e.g., an IP address, DNS entry, URL, or the other sufficient identifier for locating the client device).

At step 240 of process 200, load balancer 210 can associate client device 215 with management device 205, consistent with disclosed embodiments. For example, load balancer 210 can provide instructions to client device 215 to connect with management device 205. Alternatively or additionally, load balancer 210 can provide instructions to management device 205 to connect with client device 215. Such instructions can include a suitable identifier for the management device 205 (or for the client device 215).

At step 250 of process 200, a connection can be established between client device 215 and management device 205 using the instructions provided by load balancer 210, consistent with disclosed embodiments. In some embodiments, client device 215 can establish a UDP tunnel 250 with management device 205. In some embodiments, client device 215 can establish the UDP tunnel in response to a request received from management device 205 (e.g., a UDP datagram encapsulating a SYN message intended for a target device). In some embodiments, management device 205 can maintain a set of connected client endpoints, such as client device 215. The set of connected client endpoints can group the client endpoints by IP address (or potential geographic location). In some embodiments, the set of connected client endpoints can include the IP address of each available connected client endpoint.

Figure 3:
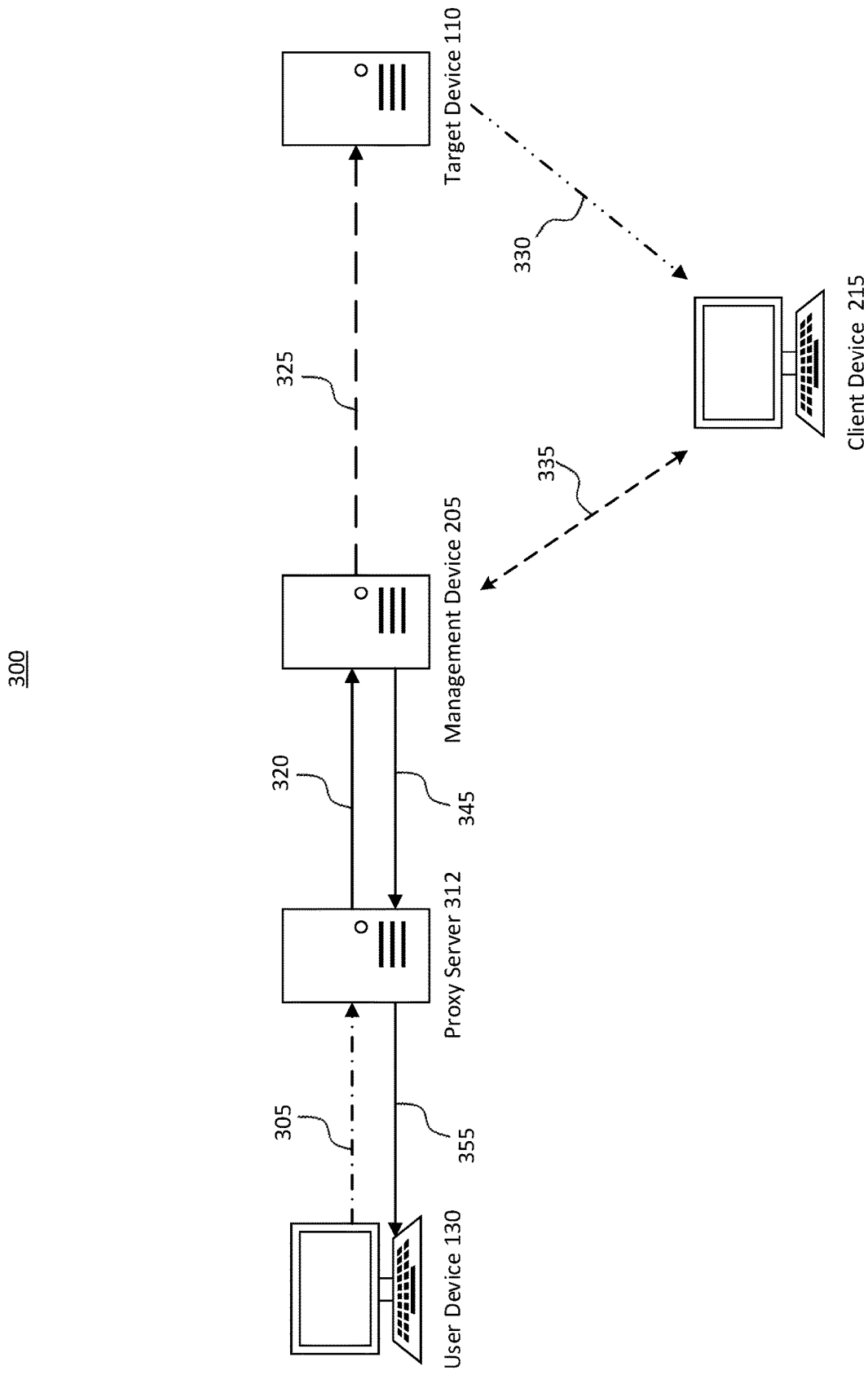
FIG. 3 depicts an exemplary process and associated system for anonymizing a request from a client device using a management device, in accordance with disclosed embodiments.

FIG. 3 depicts an exemplary process 300 and associated system for anonymizing a request from a client device using a management device, in accordance with disclosed embodiments. Process 300 can be performed using a user device (e.g., user device 130, or the like), proxy server 312, a management device (e.g., management device 205, or the like), a target device (e.g., target device 110), and a client device (e.g., client device 215, or the like). In process 300, requests from user device 130 can be sent to target device 110 through proxy server 312 and management device 205. Responses can be routed from target device 110 through client device 215 to user device 130.

Consistent with disclosed embodiments, proxy server 312 may be a system or a router that provides a gateway between user device 130 and target device 110. Proxy server 312 can facilitate web requests and responses between user device 130 and target device 110. Proxy server 312 may be a forward proxy server, a reverse proxy server, a protocol proxy server, an access proxy server, or any other type of proxy server that can facilitate requests and responses between user device 130 and target device 110.

At step 305 of process 300, user device 130 can send a request for content to target device 110, consistent with disclosed embodiments. The disclosed embodiments are not limited to requests of any particular request type or protocol. For example, in some embodiments, the request can be an HTTP, HTTPS, FTP, SSH, RPC, or other request. Furthermore, the disclosed embodiments are not limited to any particular data transmission protocol or protocol stack for this request. In some embodiments, proxy server 312 can be configured to intercept the request. Proxy server 312 can be configured to intercept the request using any suitable method. The disclosed embodiments are not limited to requests generated by any particular program or arising from any particular interaction. For example, the request can be generated by a browser in response to an interaction of a user with the user device. As an additional example, the request can be generated automatically by a program running on the user device, independent of any user interactions.

At step 320, proxy server 312 can provide the request for content to target device 110, consistent with disclosed embodiments. In some embodiments, management device 205 can transparently intercept the request. The proxy server 312 may not receive any indication that management device 205 has intercepted the request. Consistent with disclosed embodiments, proxy server 312 and management device 205 can be implemented using separate computing devices, or the same computing device. For example, proxy server 312 and management device 205 can both be hosted on the same computing device. Management device 205 can be configured for low-level interception of requests. For example, management device 205 can be configured to operate at the internet layer of the internet protocol stack (or similarly at the network layer of the Open Systems Interconnection (OSI) model).

Consistent with disclosed embodiments, management device 205 can be configured to establish a TCP connection with target device 110. As may be appreciated, as part of providing the request, proxy server 312 can attempt to establish a TCP connection with target device 110. As part of establishing the TCP connection, proxy server 312 can create and transmit a SYN message intended for target device 110. The SYN message is the first message in an exchange of synchronization and acknowledgment packets that establishes the TCP connection. The SYN message can be contained in an internet protocol (IP) packet. As may be appreciated, the IP packet can specify a source IP address (e.g., the IP address of proxy server 312) and a destination IP address (e.g., the IP address of target device 110).

Consistent with disclosed embodiments, management device 205 can intercept the IP packet containing the SYN message. In some embodiments, management device 205 can replace the source IP address with an IP address of client device 215. In some embodiments, management device 205 can simply create an IP packet including SYN request and having the correct source IP address and destination IP address.

In some embodiments, process 300 can accommodate a network firewall or routers using network address translation using hole-punching. In such embodiments, management device 205 can encapsulate the modified or created IP packet containing the SYN message into one or more UDP packets. As may be appreciated, such packaging can be one to one, many to one, many to many, or one to many. Management device 205 can provide the UDP datagram to the client device 215.

Consistent with disclosed embodiments, client device 215 can be configured to de-encapsulate the modified IP packet and provide it to target device 110, to initiate a TCP session. Such de-encapsulation can be performed at a low level (e.g., the internet layer of the internet protocol stack, the network layer of the OSI model, or the like). The contents of the UDP datagram may not be provided to, or made available to, higher-level applications running on client device 215. In this manner, firewalls or routers that would otherwise prevent client device 215 from receiving responses by target device 110 can be configured to accept or correctly route such responses. Alternatively, or additionally, management device 205 can provide the IP packet to target device 110 directly.

Consistent with disclosed embodiments, target device 110 can send a synchronization acknowledgement (SYN ACK) message in response to the SYN message. Because the source address in the IP packet containing the SYN message designated client device 215, target device 110 can send the SYN ACK message to client device 215. In embodiments in which client device 215 provided the SYN message, firewalls or routers between client device 215 and target device 110 will not drop or reject the SYN ACK message.

Consistent with disclosed embodiments, client device 215 can be configured to encapsulate the received IP packet containing the SYN ACK message into one or more UDP datagrams. Such encapsulation can be performed at a low level (e.g., the internet layer of the internet protocol stack, the network layer of the OSI model, or the like). As may be appreciated, such packaging can be one to one, many to one, many to many, or one to many. The contents of the IP packet may not be provided to, or made available to, higher-level applications running on client device 215. Client device 215 can provide the UDP datagram(s) containing the encapsulated IP packet to management device 205.

Consistent with disclosed embodiments, management device 205 can receive the UDP datagram from client device 215. Management device 205 can de-encapsulate the IP packet and modify the destination IP address to be the IP address of proxy server 312. Such de-encapsulation can be performed at a low level (e.g., the internet layer of the internet protocol stack, the network layer of the OSI model, or the like). Management device 205 can then provide the IP packet to proxy server 312, which can interpret the SYN ACK message as corresponding to the original SYN message.

Consistent with disclosed embodiments, proxy server 312 can then generate an ACK message acknowledging the receipt of the SYN ACK message. Management device 205 can then intercept the IP packet containing the ACK message and modify the IP source address to match the IP address of client device 215. In some embodiments, management device 205 can process the ACK message similar to the SYN message. Management device 205 can encapsulate the modified IP packet containing the ACK message into one or more UDP datagrams. As may be appreciated, such packaging can be one to one, many to one, many to many, or one to many. Management device 205 can then provide the UDP datagram(s) to client device 215. Client device 215 can then de-encapsulate them and provide them to target device 110. In some embodiments, management device 205 can forward the modified IP packet, consistent with conventional routing protocols, without any encapsulation.

Consistent with disclosed embodiments, receipt of the ACK message by target device 110 completes the TCP handshake and establishes a TCP connection. But proxy server 312 is configured for a TCP connection with target device 110, while target device 110 is configured for a TCP connection with client device 215. Proxy server 312 manages the first TCP connection (e.g., guaranteeing ordered data transmission, providing acknowledgements, detecting errors, discarding duplicate packets, providing flow control, and the like). Target device 110 can respond to management messages (e.g., flow control messages, acknowledgements, or the like) sent by proxy server 312 as if those messages were sent by client device 215.

At step 325 of process 300, once a TCP connection is established with target device 110, management device 205 can manage communication between proxy server 312 and target device 110, consistent with disclosed embodiments. Proxy server 312 can generate IP packets that contain requests (e.g., HTTP, FTP, SSH, or other application requests). The IP packets can indicate the address of proxy server 312 as a source IP address and the address of target device 110 as a destination IP address. Management device 205 can be configured to intercept these IP packets and modify them, changing the source IP address to the address of client device 215. Management device 205 can then forward the IP packets according to conventional routing protocols. As described herein, the interception and updating of the IP packets can be performed at a low level (e.g., without exposing the contents of the packets to applications running on management device 205).

At step 330 of process 300, target device 110 can respond to the message received from management device 205, consistent with disclosed embodiments. From the perspective of target device 110, the TCP connection appears to be with client device 215. Accordingly, target device 110 can provide a TCP response message to client device 215. Consistent with disclosed embodiments, the TCP response message can be included in one or more IP packets. The IP packet(s) can have an IP address of target device 110 as the source IP address and an IP address of client device 215 as the destination IP address. The disclosed embodiments are not limited to any particular content of the response message. In some embodiments, the response message can include data stored by target device 110, a result generated by an application hosted by target device 110, an error or informational message, a redirection message, or any other suitable response.

At step 335 of process 300, client device 215 can reflect the incoming TCP response data from target device 110 to management device 205, consistent with disclosed embodiments. Client device 215 can encapsulate the IP packets received from target device 110 into UDP datagrams. As may be appreciated, such packaging can be one to one, many to one, many to many, or one to many. The UDP datagrams can be transmitted by client device 215 to management device 205. As described herein, the encapsulation and provision of the IP packets can be performed at a low level (e.g., without exposing the contents of the packets to applications running on client device 215).

At step 345 of process 300, management device 205 can receive the UDP datagrams from client device 215, consistent with disclosed embodiments. Management device 205 can be configured to de-encapsulate the UPD datagrams to recreate the IP packet(s). Management device 205 can further be configured to update the destination IP address in the IP packet(s) to be the IP address of proxy server 320. Consistent with disclosed embodiments, management device 205 can then provide the modified IP packets to proxy server 312.

At step 355 of process 300, proxy server 312 can provide to the user device a response to the initial request (the request provided by the user device in step 305). The disclosed embodiments are not limited to any particular data transmission protocol or protocol stack for this request. In some embodiments, the response can be provided using TCP/IP, UDP/IP or some other suitable protocol or protocol stack.

Figure 4:
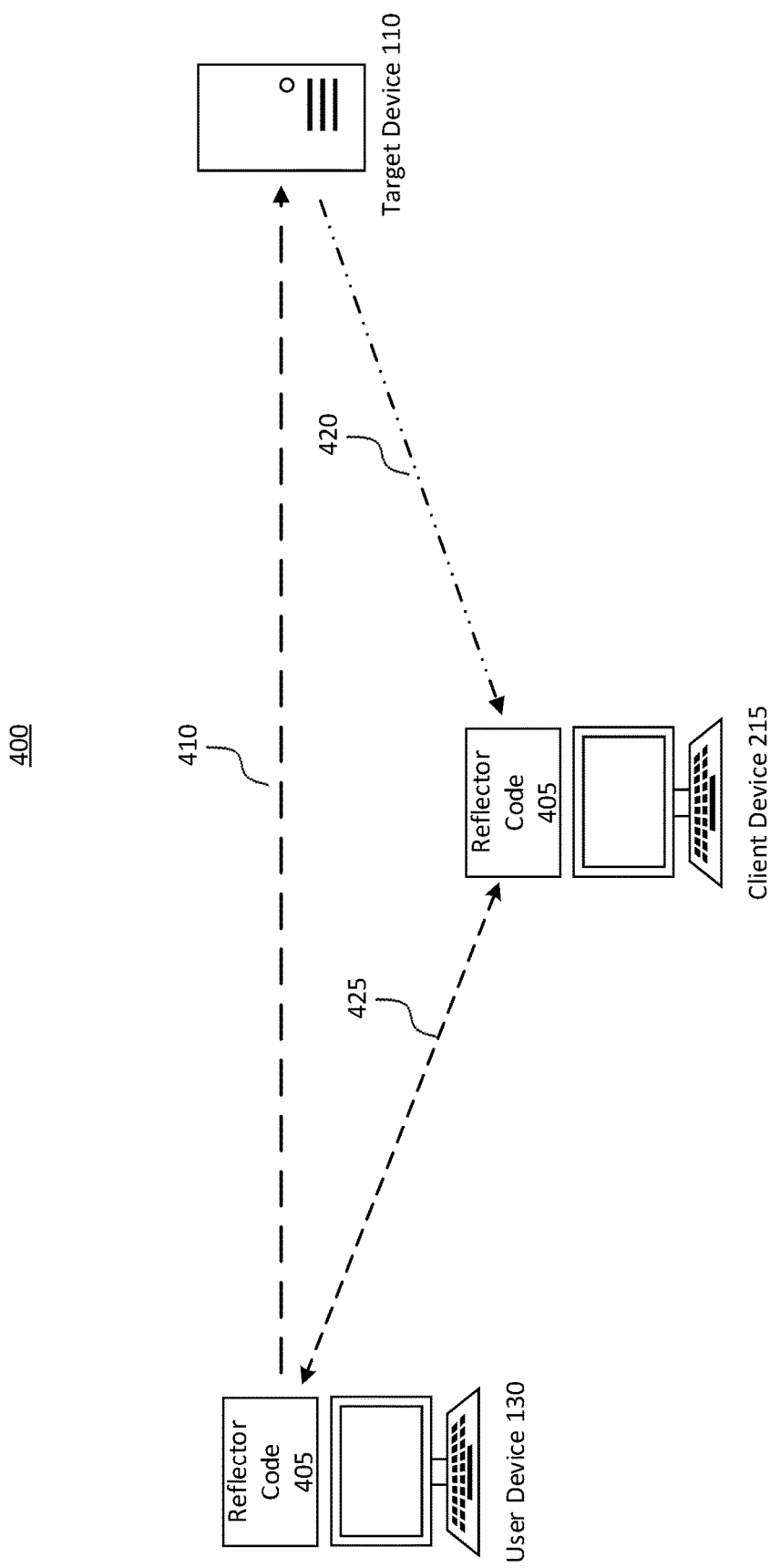
FIG. 4 depicts an exemplary process and associated system for anonymizing a request using a client device, in accordance with disclosed embodiments.

FIG. 4 depicts an exemplary process 400 and associated system for anonymizing a request using a client device, in accordance with disclosed embodiments. The system of process 400 can differ from the system of process 300 in the absence of proxy server 312 and management device 205. Instead, user device 130 can store (or access from storage) reflector code 405. When executed by user device 130, reflector code 405 can configure user device 130 to perform the functions of management device 205, described above with regards to process 300. Likewise, client device 215 can store (or access from storage) reflector code 405. When executed by client device 130, reflector code 405 can configure client device 215 to perform the functions described above with regards to process 300.

Accordingly, a request generated on user device 130 (e.g., generated by an application) can be intercepted. Consistent with disclosed embodiments, an anonymous communication session can be established between user device 130 and target device 110.

In some embodiments, user device 130 can be configured by reflector code 405 to provide a SYN message to client device 215. The SYN message can be included in an IP packet having the IP address of the client device 215 as the source IP address. The SYN message can be provided to client device 215 using UDP tunneling. In some embodiments, client device 215 can be configured by reflector code 405 to route the SYN message to target device 110.

In response, target device 110 can provide to client device 215 a SYN ACK message. The SYN ACK message can be included an IP packet having the IP address of the client device 215 as the destination IP address. In some embodiments, client device 215 can be configured by reflector code 405 to provide the SYN ACK message to user device 130. The SYN ACK message can be provided to user device 130 using UDP tunneling. User device 130 can be configured by reflector code 405 to de-encapsulate the IP packet and update the destination IP address to the IP address of user device 130.

In this manner, an outgoing communication session can be established with user device 130 being the client in the outgoing communication session. An incoming communication session can be established with target device 110 being the server in the incoming communication session.

In step 410 of process 400, user device 130 can be configured by reflector code 405 to intercept communication (e.g., requests, responses, control messages, informational messages, etc.) provided by user device 130 (e.g., by applications running on user device 130). The intercepted communication can be configured in accordance with the outgoing communication session (e.g., using as the source IP address the IP address of user device 130, or the like). The user device 130 can be configured by reflector code 405 to modify the intercepted communication to accord with the incoming communication session (e.g., by making the source IP address be the IP address of client device 215, or the like). User device 130 can then provide the intercepted communication to target device 110.

In step 420 of process 400, target device 110 can provide a message to client device 215. This communication can be configured in accordance with the incoming communication session (e.g., using as the destination IP address the IP address of client device 215). Client device 215 can be configured by reflector code 405 to encapsulate the message and provide it to client device 130 using a UDP tunnel.

In step 425 of process 400, client device 130 can be configured by reflector code 405 to intercept the message. In some embodiments, the user device 130 can be configured by reflector code 405 to modify the intercepted communication to accord with the outgoing communication session (e.g., by making the destination IP address be the IP address of user device 130, or the like). User device 130 can then process the communication.

Figure 5:
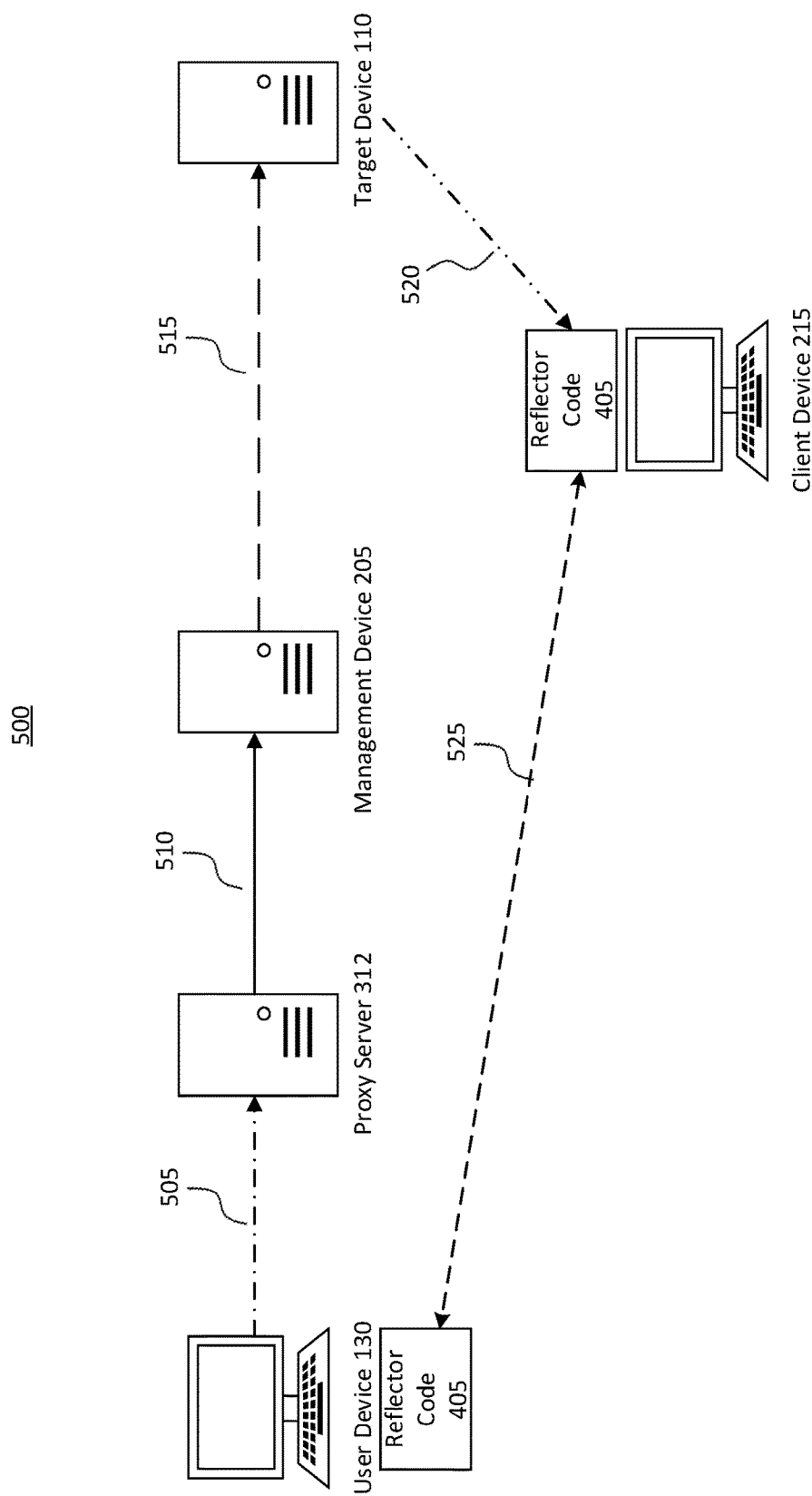
FIG. 5 depicts a block diagram of an exemplary process for anonymizing a request for content from a target device using a client device and reflector code on a user device, in accordance with disclosed embodiments.

FIG. 5 depicts an exemplary process 500 and associated system for anonymizing a request using a client device, in accordance with disclosed embodiments. The system of process 500 can differ from the system of process 300 in that responses received from target device 110 are routed directly to user device 130, rather than to management device 205.

At step 505 of process 500, user device 130 can provide a request for target device 110. In some embodiments, user device 130 can provide the request using proxy server 312 (or proxy server 312 can intercept the request).

At step 510 of process 500, proxy server 312 can provide a request (e.g., based on the originally received or intercepted request from user device 130). Management device 205 can intercept the request from proxy server 312. In some embodiments, management device 205 can be configured to modify the request. Management device 205 can update the source associated with the request (e.g., the source IP address, or the like). The updated source associated with the request can be client device 215 (e.g., the updated IP address can be client device 215).

At step 515 of process 500, management device 205 can provide the updated request to target device 110. Target device 110 can generate a response to the request. A destination associated with the response can be client device 215. In some embodiments, the response can be contained in one or more IP packets. In such embodiments, the destination IP address of the IP packet(s) can be the IP address of client device 215.

At step 520 of process 500, target device 110 can provide the response to client device 215. The response can be provided to client device 215. Client device 215 can be configured by reflector code 405 to reflect the response to user device 130. In some embodiments, the reflection can be performed at a low level (e.g., the reflection can be performed without providing access to the contents of the response to applications running on client device 215, or the like). In some embodiments, client device 215 can be configured by reflector code 405 to encapsulate one or more IP packets containing the response into one or more UDP datagrams.

At step 525 of process 500, client device 215 can be configured by reflector code 405 to provide the updated response to user device 130 (e.g., client device 215 can provide the UDP datagram(s) to user device 130, or the like). User device 130 can be configured by reflector code 405 to update the received response. In some embodiments, updating the response can include de-encapsulating the IP packet(s) contained in the UDP datagram(s). In some embodiments, updating the response can include updating a destination associated with the response. The destination can be updated from client device 215 to user device 130. In some embodiments, updating the destination can include updating a destination IP address of the IP packet(s) to be the IP address of user device 130. User device 130 can then process the updated IP packet(s), providing the information contained therein to the requesting process or application on user device 130.

Figure 6:
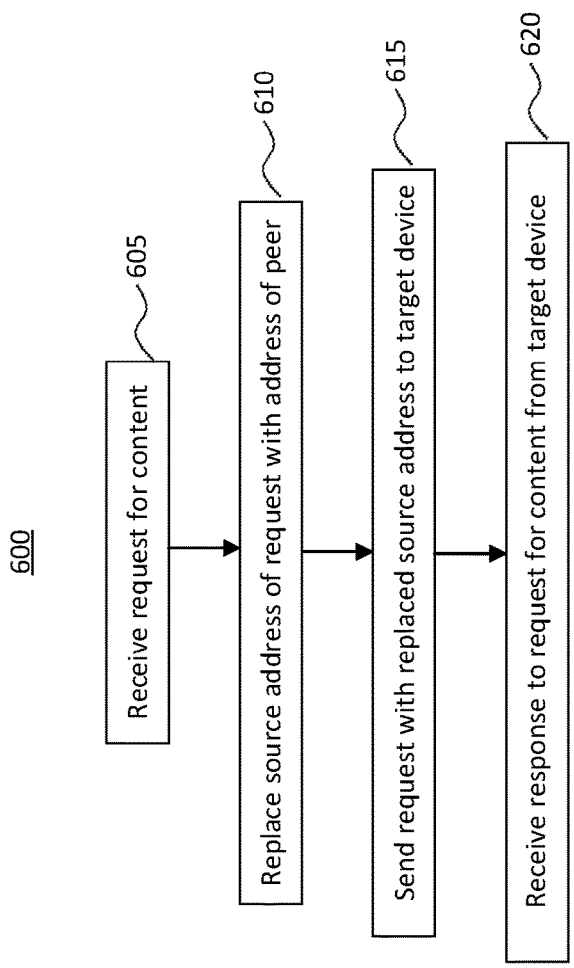
FIG. 6 depicts a flowchart of an exemplary process for anonymizing a request for content from a target device by a client device, in accordance with disclosed embodiments.

FIG. 6 depicts a flowchart of an exemplary process for anonymizing a request for content from a target device (e.g., target device 110) by a client device (e.g., client device 215), in accordance with disclosed embodiments. For convenience of description, the operations of FIG. 6 are described from the viewpoint of a management device (e.g., management device 205). However, this description is not intended to be limited. In some embodiments, the operations could be performed by a user device (e.g., as described above with regards to FIG. 4), or performance of the operations could be split between the management device and the user device (e.g., as described above with regards to FIG. 5).

In step 605 of process 600, the management device can receive a request (e.g., a request for content). In some embodiments, the request can originate from a user device 130 and can specify a target device, such as a web server. In some embodiments, the request can include a request line, a series of header fields, and a message body. In some embodiments, request can be or include a request to read or retrieve data from web server, a request to send data to web server, a request to modify data on web server, a request to delete data on web server, or any other type of request from a user device to a web server. In some embodiments, the request for content can be an HTTP request (or any other suitable request, as described herein). In some embodiments, receiving the request can include receiving an IP packet including the HTTP request.

In step 610 of process 600, the management device can update a source associated with the request. The source associated with the request can be updated from the user device to a peer device (e.g., client device 215 or the like). In some embodiments, updating the source can include updating a source address. The source address can be the address from which a packet of data originates on a network. The source address can be the source address of user device 130. In some embodiments, a source address can be a physical address such as the MAC address of an ethernet frame. In other embodiments, a source address can be an IP address.

In some embodiments, updating a source address can include replacing the source address with an address of the peer device. The management device can be configured to select the peer device (or the address of the peer device) from a set of addresses. In some embodiments, the management device may have received the set of peer devices (or addresses) from another device, such as a load balancer (e.g., load balancer 210). In some embodiments, the management device can create or maintain a list of peer devices (or addresses). The replacement address can be selected from the list. In some embodiments, the source address and replacement address can be IP addresses.

In step 615 of process 600, the management device can provide the updated request (e.g., with the replaced source address) to the target device. In some embodiments, providing the request can include establishing a TCP outgoing connection with the management device as the client. An incoming TCP connection can be established with the target device as the server. The traffic management device can send the request using TCP/IP, with the source IP address being the IP address of the peer device. The target device can then send the response to request using TCP/IP to the peer device. In some embodiments, the response can be included in multiple IP packets.

In step 620 of process 600, the management device can receive the response from the target device via the peer device. The peer device can receive the response and provide the response to the management device using UDP tunneling (e.g., by encapsulating the response into one or more UDP datagrams and providing the UDP datagrams to the management device). In some embodiments, the response can be encrypted, and the peer may not have the necessary information to decrypt the response. This can allow for secure transmission of data through the peer without allowing the peer to determine the information being transmitted.

In some embodiments, the management device can provide a message to the peer device. In some embodiments, the message can be sent prior to sending the updated request. In other embodiments, the message can be sent prior to receiving the response. The disclosed embodiments are not limited to a particular method of sending the message to the peer device. The message can include an identifier of the target device (e.g., a URI, a UID, a URL, or any other suitable identifier). The message can enable the peer device to receive the response from the target device. In some embodiments, the peer device can forward the message (or another message based on the received message) to the target device. In some embodiments, message can include a SYN message, which the peer device can route to the target device. The web server can respond to the SYN message with a SYN ACK message.

In some embodiments, the management device can obtain information specifying a set of client devices. The management device can obtain this information from a load balancing server. The information can enable the management device to contact each client device. In some embodiments, the information can include an identifier of each of the set of client devices (e.g., an IP address, URL, or the like). The information can be sufficient to enable the management device to create an anonymous proxy connection between a user device and a target device, using the client device. In some embodiments, the management device can select one of the client devices (e.g., client device 215) for use in creating the anonymous proxy connection. In some embodiments, the management device can select the one of the client devices prior to receiving the request from the user device. In various embodiments, the management device can select the one of the client devices after receiving the request from the user device.

Figure 7:
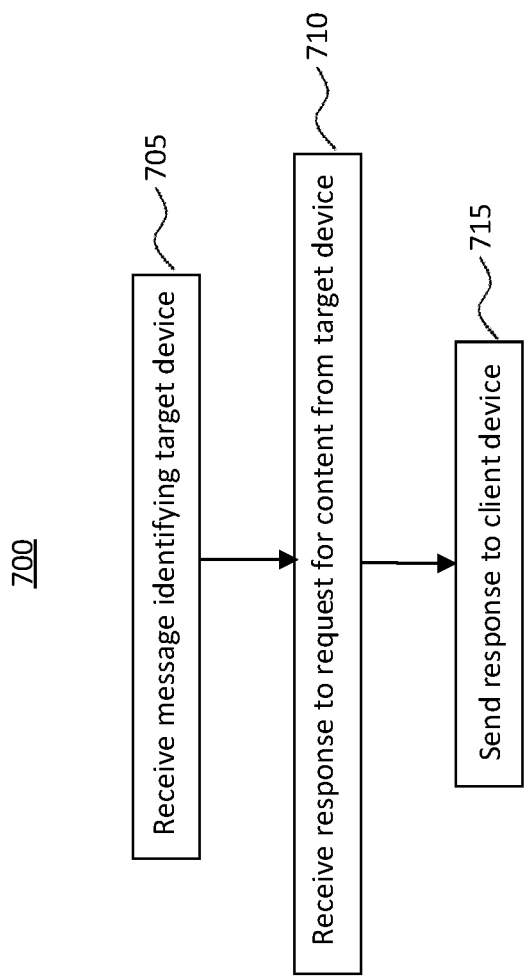
FIG. 7 depicts a flowchart of an exemplary process for anonymizing a request for content from a target device by a peer, in accordance with disclosed embodiments.

FIG. 7 depicts a flowchart of an exemplary process 700 for anonymizing a request for content from a target device by a peer, in accordance with disclosed embodiments. The target device can be a web server. The request can include a request to read or retrieve data from the target device, a request to send data to the target device, a request to modify data on the target device, a request to delete data on the target device, or any other type of request for data or information from the target device. In some embodiments, the request for content can be an HTTP request. For convenience of description, the operations of FIG. 7 are described from the viewpoint of a client device (e.g., client device 215). However, this description is not intended to be limiting.

In step 705 of process 700, the client device can receive a message identifying a target device (e.g., target device 110). The disclosed embodiments are not limited to any particular method of receiving the message. In some embodiments, the message received through a peer-to-peer messaging application, through a TCP/IP connection, a UDP/IP connection, or any other suitable connection. In some embodiments, the message can include an identifier of the target device. The identifier can be or include a uniform resource identifier (URI), a unique identifier (UID), uniform resource locator (URL), or any other identifier that can identify the target device to the client device. The message can give the client device the information needed to communicate with the target device. In some embodiments, the client device can receive the message from a user device (e.g., user device 130). In other embodiments, the client device can receive the message from a management device (e.g., management device 205). In some embodiments, user device 130 can be a personal computer. In some embodiments, the client device may be a mobile device, a personal computer, or a laptop.

In step 710 of process 700, the client device can receive, from the target device, a response to a request from the user device to the target device. In some embodiments, the request for content can be an HTTP request. In some embodiments, the response to the request for content can be encrypted. Encryption of the response to the request for content can comprise encoding the content of the response such that the content of the response cannot be determined without decryption. The peer may not have the information needed to decrypt the response, such as a private key for decryption. In some embodiments, the response to the request for content can contain multiple packets.

In step 715 of process 700, the client device can send the response to the management device (or in some embodiments directly to the user device). In some embodiments, the client device can encapsulate the response into one or more UDP datagrams and provide the UDP datagrams to the management device or client device. The management device (or client device) can extract the response from the UDP packet. The management device can deliver the TCP packets to the user device.

In some embodiments, process 700 can include sending a message to the target device. The client device can send a message to the target device after receiving a message identifying the target device. In some embodiments, the message can be a ping. A ping can be a message to determine if web server is reachable across a network. A ping can use an internet control message protocol (ICMP) packet to send an ICMP echo request and wait for an ICMP echo reply. In some embodiments, the message can open a connection between the client device and the target device. The opened connection can prevent communication between the client device and the target device from being dropped by a firewall of the client device.

Figure 8:
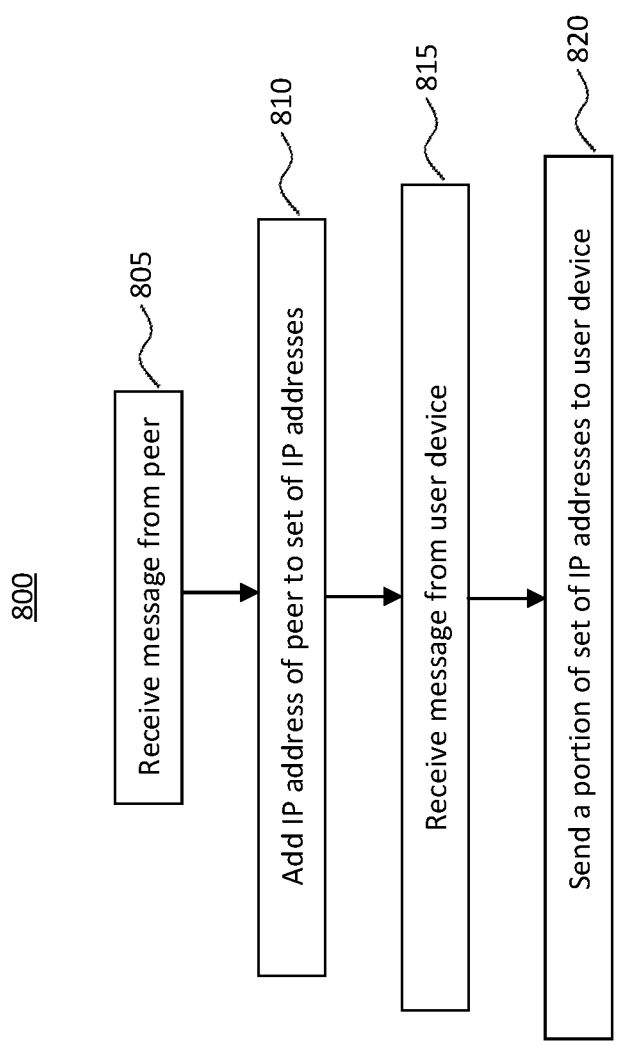
FIG. 8 depicts a flowchart of an exemplary process for anonymizing a request for content from a target device by a server, in accordance with disclosed embodiments.

FIG. 8 depicts a flowchart of an exemplary process 800 for anonymizing a request for content from a target device by a server, in accordance with disclosed embodiments. Process 800 can be performed by a management device (e.g., management device 205).

In step 805 of process 800, the management device can receive a message from a client device (e.g., client device 215). In some embodiments, the message can include identifying information sufficient for a management device (e.g., management device 205) to provide messages (e.g., UDP packets, configuration information, or the like) to the client device. In some embodiments, the identifying information can be or include an IP address (or similar information) of the client device.

In step 810 of process 800, the management device can add the identifying information of the client device to a set of identifying information. The set of identifying information can include identifying information received by the server from other client devices. The client devices can be trusted for use in anonymizing a request from a user device (e.g., user device 130) to a target device (e.g., target device 110).

In step 815 of process 800, the management device can receive a message from a user device. A message can include a request from a target device. In various embodiments, the management device can receive the message from the user device, or intercept the message from the user device.

In step 820 of process 800, the management device can send, in response to receiving the message, one or more items of the set of identifying information. The provided items can include one or more IP addresses (or the like) corresponding to client devices. The items can be sent to the user device.

In some embodiments, the management device can receive a second message from the user device. The second message can indicate the client device selected by the user device for anonymizing the content request. Consistent with disclosed embodiments, the management device can use the indicated client device for anonymizing the request.

Figure 9:
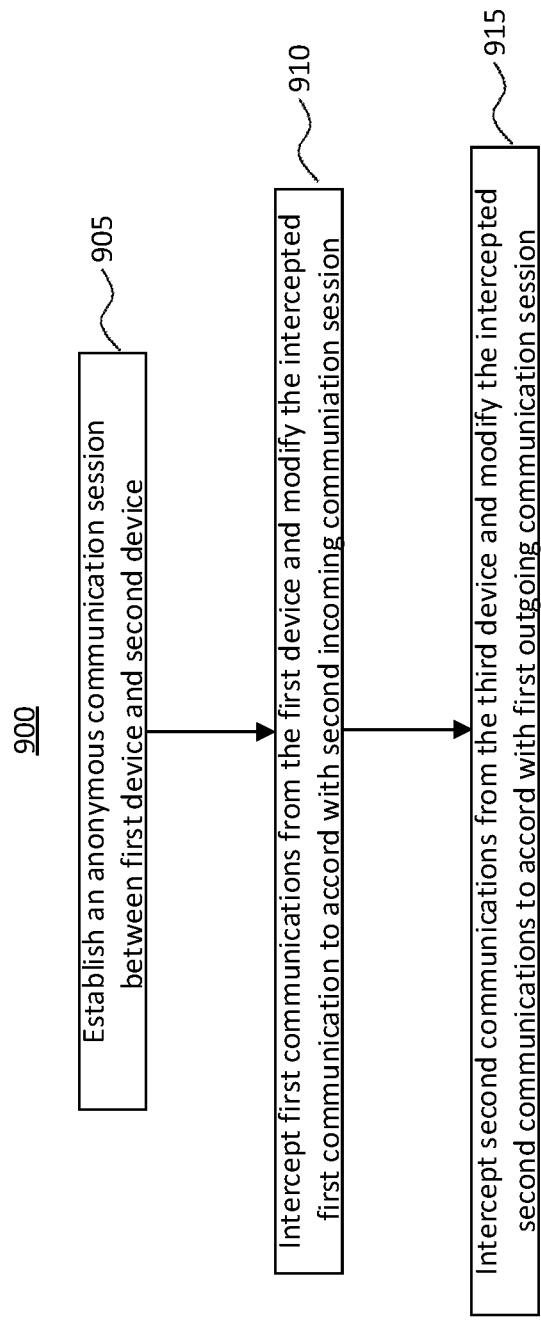
FIG. 9 depicts a flowchart of an exemplary process for establishing an anonymous communication session between a first device and a second device, in accordance with disclosed embodiments.

FIG. 9 depicts a flowchart of an exemplary process 900 for establishing an anonymous communication session between a first device and a second device, in accordance with disclosed embodiments. The first device can comprise a proxy server, such as proxy server 312. The second device can comprise a target device, such as target device 110.

In step 905 of process 900 can include establishing an anonymous communication session between the first device and the second device, consistent with disclosed embodiments. The anonymous communication session between the first device and the second device can include an outgoing communication session with the second device, the first device being a client in the outgoing communication session. The anonymous communication session between the first device and the second device can include an incoming communication session with a client device (e.g., client device 215), the second device being a server in the incoming communication session. The client device can be configured to automatically route communications received in the second incoming communication session to the first device. In some embodiments, automatically routing communications can comprise packaging one or more received TCP segments into one or more UDP datagrams. In some embodiments, the management device can be configured to enable creation of the first and second communication sessions by modifying intercepted messages from the first device to the target device and messages received from the client device. In some embodiments, the first outgoing communication session and the second incoming communication session can comprise TCP connections.

In step 910 of process 900, the management device can intercept the first communications between the first device and the second device, consistent with disclosed embodiments. The first communications can be in accordance with the first outgoing communication session. The management device can modify the intercepted first communications to accord with the second incoming communication session and provide the modified first communications to the second device. Modifying the intercepted first communications can comprise replacing the source address of the first device with the IP address of the selected third device. In some embodiments, the first communications can include requests for content by the first device from the second device.

In step 915 of process 900, the management device can obtain second communications routed from the third device, consistent with disclosed embodiments. The second communications can be in accordance with the second incoming communication session. The management device can modify the obtained second communications to accord with the first outgoing communication session and provide the modified second communications to the first device. The second communications can include responses by the target device to received requests. In some embodiments, the management device can intercept second communications routed from the third device. In various embodiments, the third device can direct the second communications to the management device. Modifying the obtained second communications can include obtaining IP packets encapsulated into UDP datagrams, de-encapsulating the IP packets, and updating the destination address of the IP packets.

The disclosed embodiments can be implemented in a system, a method, and/or a computer program product. The computer program product can include a non-transitory computer-readable storage medium (or media) having computer-readable program instructions thereon for causing a processor to carry out aspects of the present invention.

The non-transitory computer-readable storage medium can be a tangible device that can retain and store instructions for use by an instruction execution device. The non-transitory computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of suitable non-transitory computer-readable storage medium includes: a solid-state memory, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, can also be provided in combination in a single embodiment. Conversely, various features of the invention, which are, for brevity, described in the context of a single embodiment, can also be provided separately or in any suitable sub combination or as suitable in any other described embodiment of the invention. Certain features described in the context of various embodiments are not to be considered essential features of those embodiments unless the embodiment is inoperative without those elements.

The disclosed embodiments are further described by the following numbered clauses:

1. A method performed by a management device for anonymizing a request for content from a web server, the method comprising: receiving the request for content; replacing a source address of the request with an address of a peer; sending the request with the replaced source address to the web server; and receiving a response to the request for content from the web server via the peer.

2. The method of clause 1, wherein the source address is an Internet Protocol (IP) address.

3. The method of any one of clauses 1 to 2, further comprising selecting the source address from a set of IP addresses provided by a server.

4. The method of any one of clauses 1 to 3, further comprising sending a message to the peer.

5. The method of clause 4, wherein the message is sent prior to sending the request with the replaced source address to the web server.

6. The method of any one of clauses 4 to 5, wherein the message includes an identifier of the web server.

7. The method of any one of clauses 4 to 6, wherein the message is sent prior to receiving the response to the request for content from the web server.

8. The method of any one of clauses 1 to 7, wherein the response is sent via a UDP tunnel.

9. The method of clause 8, wherein the UDP tunnel is between the management device and the peer.

10. The method of clause 8, wherein the UDP tunnel is between the peer and a server.

11. The method of any one of clauses 1 to 10, wherein the request for content is an HTTPS request.

12. The method of any one of clauses 1 and 4 to 11, further comprising: initiating a session with a server; and receiving, in response to initiating the session, a set of IP addresses from the server, wherein the address of another client device is selected from the received set of IP addresses from the server.

13. A method performed by a peer for anonymizing a request for content from a web server, the method comprising: receiving a message identifying the web server; receiving, after receiving the message, a response to the request for content from the web server, wherein the request was sent by client device; and sending the response to the client device.

14. The method of clause 13, further comprising sending a message to the web server.

15. The method of clause 14, wherein the sent message is a ping.

16. The method of any one of clauses 14 to 15, wherein the sent message opens a connection between the peer and the web server.

17. The method of any one of clauses 13 to 16, wherein sending the response includes sending the response via a UDP tunnel.

18. The method of clause 17 wherein the UDP tunnel is between the peer and the client device.

19. The method of any one of clauses 17 to 18, wherein the UDP tunnel is between the peer and a server.

20. The method of any one of clauses 13 to 19, wherein the message is received from the client device.

21. The method of any one of clauses 13 to 20, wherein the message is received from a server.

22. The method of any one of clauses 13 to 21, wherein the client device is a personal computer.

23. The method of any one of clauses 13 to 21, wherein the peer is a mobile device.

24. The method of any one of clauses 13 to 21, wherein the peer is a personal computer.

25. The method of any one of clauses 13 to 21, wherein the peer is a laptop.

26. The method of any one of clauses 13 to 25, wherein the request for content is an HTTPS request.

27. The method of clause 26 wherein the response is encrypted, and the peer does not have the information needed to decrypt the response.

28. The method of any one of clauses 26 to 27, wherein the response contains multiple packets.

29. A method performed by a server for anonymizing a request for content from a web server, the method comprising: receiving a message from a peer, the message including an IP address of the peer; adding the IP address of the peer to a set of IP addresses; receiving a message from a client device; and sending, in response to receiving the message from the client device, at least a portion of the set of IP addresses.

30. The method of clause 29, further comprising establishing a UDP tunnel between the peer and the server.

31. The method of clause 30, further comprising receiving a response to the request for content via the established UDP tunnel.

32. The method of any one of clauses 29 to 31, further comprising establishing a UDP tunnel between the client device and the server.

33. The method of clause 32, further comprising sending a response to the request for content via the established UDP tunnel.

34. The method of any one of clauses 29 to 33, further comprising receiving a second message from the peer, the second message including an IP address selected from the at least a portion of the set of IP addresses.

35. The method of clause 34, further comprising sending, in response to the second message, a message to the peer identified by the included IP address, wherein the message causes the peer to send a message to the web server.

36. A method for anonymous communication between a first device and a second device, the method comprising: establishing, by a management device, an anonymous communication session between the first device and the second device, the anonymous communication session including: a first outgoing communication session with the second device, the first device being a client in the first outgoing communication session; and a second incoming communication session with a third device selected by the management device, the second device being a server in the second incoming communication session and the third device being configured to automatically route communications received in the second incoming communication session to the first device; intercepting, by the management device, first communications from the first device in accordance with the first outgoing communication session, modifying the intercepted first communications to accord with the second incoming communication session, and providing the modified first communications to the second device; and obtaining, by the management device, second communications routed from the third device, modifying the obtained second communications to accord with the first outgoing communication session, and providing the modified second communications to the first device.

37. The method of clause 36, wherein automatically routing communications comprises packaging one or more received TCP segments into one or more UDP datagrams.

38. The method of any one of clauses 36 to 37, wherein modifying the intercepted first communications to accord with the second incoming communication session comprises replacing a destination IP address with an IP address of the first device.

39. The method of any one of clauses 36 to 38, wherein modifying the obtained second communications to accord with the first outgoing communication session comprises replacing a source IP address with an IP address of the third device.

40. The method of any one of clauses 36 to 39, wherein establishing the anonymous communication session further comprises: sending a SYN request to the third device for relaying to the second device; and configuring the third device to relay received TCP segments to the first device.

41. The method of any one of clauses 36 to 40, wherein: the third device is configured to provide low-level routing of communications received from the second device; or the management device is configured to perform low-level modification of the first and second communications.

42. The method of any one of clauses 36 to 41, wherein the first communications comprise at least one TCP packet containing encrypted data, or the second communications comprise at least one TCP packet containing encrypted data.

43. The method of any one of clauses 36 to 42, wherein the first communication comprises an HTTP or HTTPS request.

44. The method of any one of clauses 36 to 43, further comprising: receiving, by the management device from a load balancing server, information specifying a set of peer device; and selecting the third device from the set of peer devices.

45. The method of clause 44, wherein: selecting the third device from the set of peer devices comprises: providing, by the management device to the first device, information specifying at least a portion of the set of peer devices; and receiving a selection of the third device from the first device.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for anonymous communication between a first device and a second device, the method comprising:
    establishing, by a management device, an anonymous communication session between the first device and the second device, the anonymous communication session including:
        a first outgoing communication session with the second device, the first device being a client in the first outgoing communication session; and
        a second incoming communication session with a third device selected by the management device, the second device being a server in the second incoming communication session and the third device being configured to automatically route communications received in the second incoming communication session to the first device;
    intercepting, by the management device, first communications from the first device, modifying the intercepted first communications to accord with the second incoming communication session, and providing the modified first communications to the second device; and
    obtaining, by the management device, second communications routed from the third device, modifying the obtained second communications to accord with the first outgoing communication session, and providing the modified second communications to the first device.

2. The method of claim 1, wherein automatically routing communications comprises packaging one or more received TCP segments into one or more UDP datagrams.

3. The method of claim 1, wherein modifying the intercepted first communications to accord with the second incoming communication session comprises replacing a destination IP address with an IP address of the first device.

4. The method of claim 1, wherein modifying the obtained second communications to accord with the first outgoing communication session comprises replacing a source IP address with an IP address of the third device.

5. The method of claim 1, wherein establishing the anonymous communication session further comprises:
    sending a SYN request to the third device for relaying to the second device; and
    configuring the third device to relay received TCP segments to the first device.

6. The method of claim 1, wherein:
    the third device is configured to provide low-level routing of communications received from the second device; or
    the management device is configured to perform low-level modification of the first and second communications.

7. The method of claim 1, wherein the first communications comprise at least one TCP packet containing encrypted data, or the second communications comprise at least one TCP packet containing encrypted data.

8. The method of claim 1, wherein the first communication comprises an HTTP or HTTPS request.

9. The method of claim 1, further comprising:
    receiving, by the management device from a load balancing server, information specifying a set of peer device; and
    selecting the third device from the set of peer devices.

10. The method of claim 9, wherein:
selecting the third device from the set of peer devices comprises:
providing, by the management device to the first device, information specifying at least a portion of the set of peer devices; and
receiving a selection of the third device from the first device.

11. A management device for providing anonymous communication between a first device and a second device, the system comprising:
at least one processor; and
at least one non-transitory computer-readable medium containing instructions that, when executed by the at least one processor, cause the management device to perform operations comprising:
establishing an anonymous communication session between the first device and the second device, the anonymous communication session including:
a first outgoing communication session with the second device, the first device being a client in the first outgoing communication session; and
a second incoming communication session with a third device selected by the management device, the second device being a server in the second incoming communication session and the third device being configured to automatically route communications received in the second incoming communication session to the first device;
intercepting first communications from the first device, modifying the intercepted first communications to accord with the second incoming communication session, and providing the modified first communications to the second device; and
obtaining second communications routed from the third device, modifying the obtained second communications to accord with the first outgoing communication session, and providing the modified second communications to the first device.

12. The management device of claim 11, wherein the obtained second communications comprise one or more received TCP segments packaged into one or more UDP datagrams.

13. The management device of claim 11, wherein modifying the intercepted first communications to accord with the second incoming communication session comprises replacing a destination IP address with an IP address of the first device.

14. The management device of claim 11, wherein modifying the obtained second communications to accord with the first outgoing communication session comprises replacing a source IP address with an IP address of the third device.

15. The management device of claim 11, wherein establishing the anonymous communication session further comprises:
sending a SYN request to the third device for relaying to the second device; and
configuring the third device to relay received TCP segments to the first device.

16. The management device of claim 11, wherein:
the modification of the first and second communications is performed at a low level.

17. The management device of claim 11, wherein the first communications comprise at least one TCP packet containing encrypted data, or the second communications comprise at least one TCP packet containing encrypted data.

18. The management device of claim 11, wherein the first communication comprises an HTTP or HTTPS request.

19. The management device of claim 11, further comprising:
receiving, from a load balancing server, information specifying a set of peer device; and
selecting the third device from the set of peer devices.

20. The management device of claim 19, wherein:
selecting the third device from the set of peer devices comprises:
providing, to the first device, information specifying at least a portion of the set of peer devices; and
receiving a selection of the third device from the first device.

* * * * *